D. W. JOHN.
FLY TRAP.
APPLICATION FILED APR. 25, 1912.
1,082,027.
Patented Dec. 23, 1913.
2 SHEETS—SHEET 1.
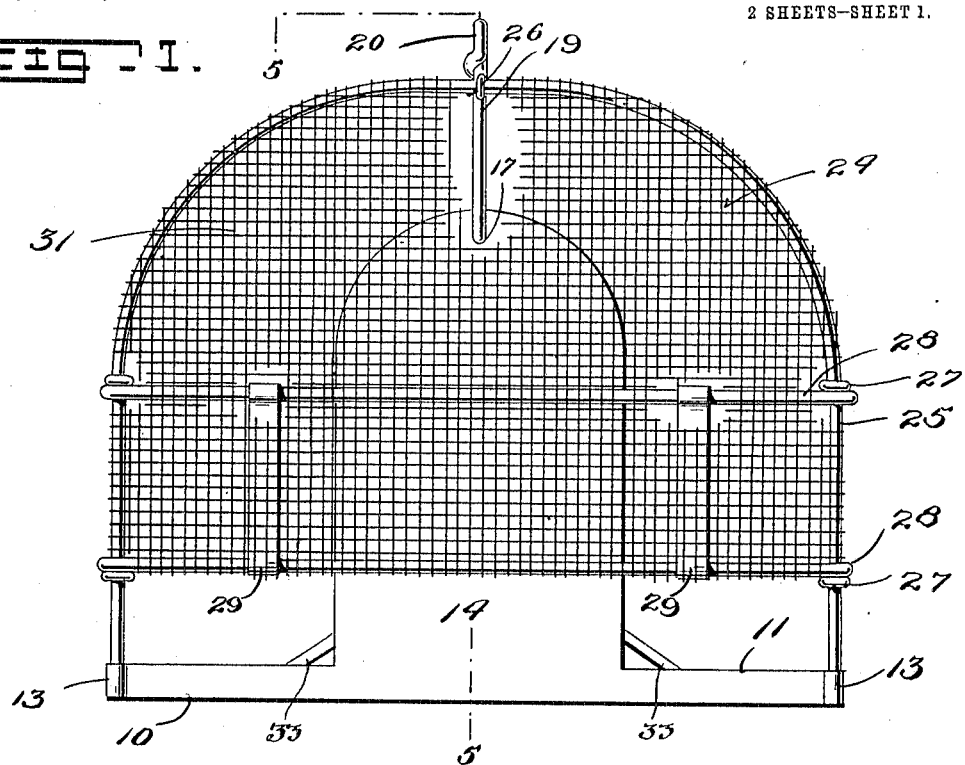
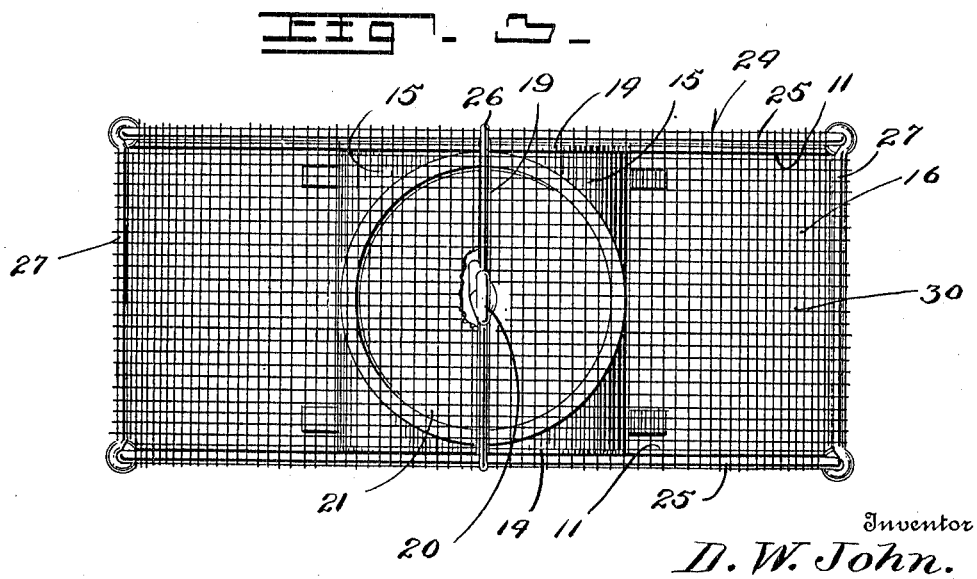
Witnesses
Inventor
D. W. John.
By
Attorneys

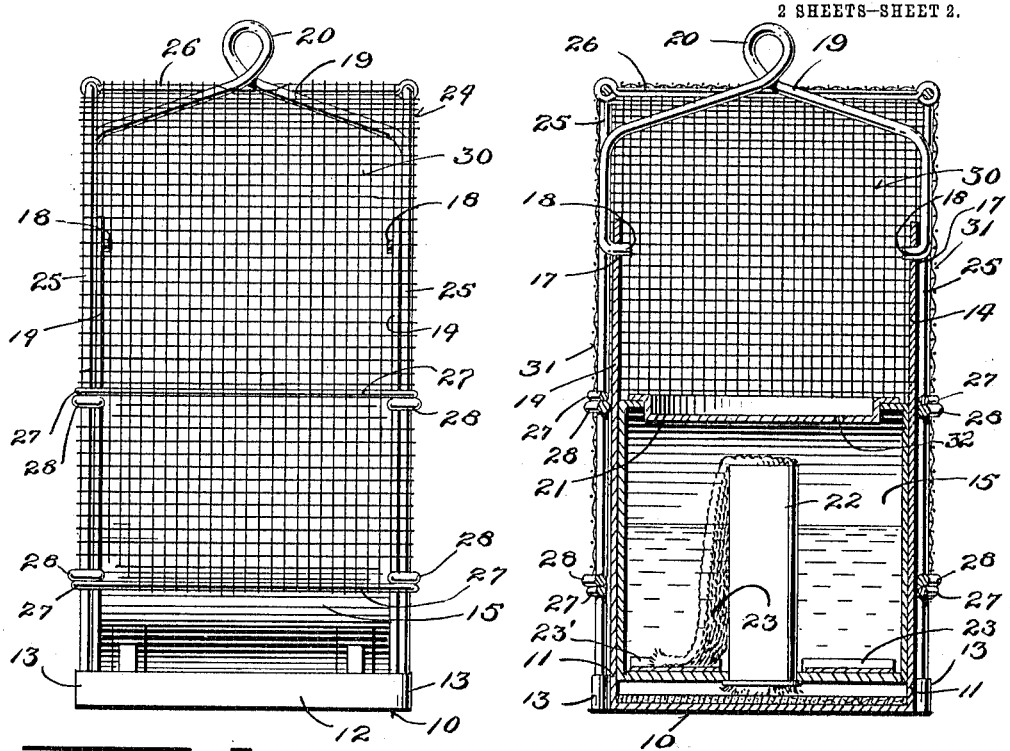

UNITED STATES PATENT OFFICE.

DANIEL WILLIAM JOHN, OF DEMPSEY, IDAHO, ASSIGNOR OF ONE-HALF TO GEORGE JOHN, OF DEMPSEY, IDAHO.

FLY-TRAP.

1,082,027. Specification of Letters Patent. Patented Dec. 23, 1913.

Application filed April 25, 1912. Serial No. 693,174.

*To all whom it may concern:*

Be it known that I, DANIEL W. JOHN, a citizen of the United States, residing at Dempsey, in the county of Bannock, State of Idaho, have invented certain new and useful Improvements in Fly-Traps; and I do hereby declare the following to be a full, clear, and exact description of the invention, such as will enable others skilled in the art to which it appertains to make and use the same.

This invention relates to fly traps and has for its object the provision of an improved and simple trap structure which comprises a pan adapted to contain a piece of felt or other absorbent material, the said pan also supporting a tank adapted to contain poisonous material which is fed by capillary attraction or otherwise to the felt whereby the latter becomes saturated and when the flies come in contact therewith, they will be instantly killed.

Another object of the invention is to provide a trap having a pan carrying a piece of absorbent material and in which the pan is further provided with side portions adapted to resiliently clamp a tank therebetween, which tank contains a poisonous liquid for saturating the said material and in which the said side portions are connected by a bail serving to conveniently carry the trap and hold said side portions in a clamped position.

A further object is to provide a trap of the aforenamed character with a foraminous or protective cover permitting the entrance of the flies into the pan at the bottom portion thereof and preventing their exit upwardly of the cover and in which the said cover receives the bail therethrough.

With the above and other objects in view, the invention consists of certain other combinations and arrangements of parts to be hereinafter more fully described, claimed and illustrated in the accompanying drawings in which:

Figure 1 is a side elevation of my improved fly trap. Fig. 2 is an end elevation thereof. Fig. 3 is a top plan view of the device. Fig. 4 is a perspective view of the device with the protective cover removed. Fig. 5 is a sectional view on the line 5—5 of Fig. 1.

Referring to the drawings in detail, the numeral 10 indicates a pan of rectangular formation, the same being formed of a single section of material, preferably metal, having its side edges bent upwardly as shown at 11 and its end edges bent upwardly as shown at 12, the said sides and ends being formed by severing the said section from opposite sides so that the extremities of the end portions are formed with protruding portions which are bent inwardly to form circular sockets 13 vertically disposed and which are adapted for supporting the cover of the trap as will be hereinafter shown.

The side portions of the pan 10 are provided with extensions reduced in length relative thereto and which are bent upwardly at right angles and in spaced relation to form side clamping members 14 adapted to receive and tightly clamp a tank 15 therebetween with the tank supported on the central portion of the pan and upon a section of felt or other suitable absorbent material 16 mounted therein. The upper ends of the clamping members 14 are centrally apertured as shown at 17 for receiving the inwardly extended extremities 18 of an inverted U-shaped bail 19 preferably formed of wire and provided with an upwardly extending central coil 20 serving to spring the leg portions of the bail together and tightly clamp the members 14 against the ends or adjacent portions of the tank 15 for supporting the latter against movement. The coil 20 also forms an eye by which the trap may be suspended and conveniently handled.

The tank 15 is provided with a removable cover 21 which has a wick tube 22 vertically supported therebeneath through an opening in the bottom of the tank and formed of a cross section approximating that of a strip of wicking 23 which extends through the tube and into the poisonous material or liquid within the tank and has its outer end extended to the absorbent material or felt so as to supply the said poisonous liquid thereto by capillary attraction, thereby retaining the felt in a sufficiently moist condition to kill the flies by contact therewith. To obtain the necessary poisonous solution it is preferred that a small piece of poison-coated paper 23′ be placed in the tank and then covered with water, although a solution of water and poison in some other form, such as powdered or lump may be employed with equal facility.

The foraminous or protective cover is indicated by the numeral 24 and comprises a pair of inverted U-shaped side frame members 25 preferably formed of wire and held in spaced parallel relation by means of a top connecting brace 26 and pairs of spaced side braces 27 connecting the leg portions thereof and having the lowermost braces located above the extremities of the leg portions. The sides of the cover or the leg portions of the frame members are connected by spaced longitudinal brace wires 28 which have their end portions secured inwardly of the connecting members 27 whereby the latter hold the said brace wires 28 from displacement on the leg portions of the frame members. The longitudinal brace wires 28 are further held in position by brace strips 29 which have their end portions coiled around the wires 28 to prevent separation of the latter. The frame thus provided is covered with wire mesh and comprises a strip 30 which is secured between the frame members and the side strips 31 connected to each frame member and its lower longitudinal brace wire so that the wire mesh is spaced from the lower portion of the frame.

The extremities of the leg portions are then inserted in the circular sockets 13 formed at the corners of the pan and incloses the clamping members 14 and tank and the coil 20 protrudes through the central upper portion of the wire mesh to perform its function as a handle. The space between the bottom edges of the wire covering or the lower brace members and the pan thus permits the entrance of the flies into the trap where they are prevented from escaping by their usual tendency to travel upward and should they come in contact with the poisonous liquid they will be instantly killed.

I wish to have it understood that I may make such changes in the construction and modification of the invention as fairly fall within the scope of the appended claims, it being further submitted that the device under the statutes is protected for all desirable uses to which it may be put without departing from the spirit of the invention or sacrificing any of its advantages.

An opening 32 is formed in the top 21 of the tank 15 to admit air for forcing the liquid therefrom and the said tank is supported from rolling or tipping over by legs 33 disposed two on each side and adjacent each end of the tank.

I claim:

1. In a fly trap, a pan formed with corner sockets and adapted to contain a section of absorbent material, said pan having side portions centrally located to form clamping members, a liquid containing tank held between said side portions and means provided to supply the same to said material, a bail connecting the upper ends of said side portions and a frame of wire mesh having leg portions adapted to engage the sockets and provide a surrounding entrance opening.

2. A trap comprising a pan formed of a section of metal with its edges bent to form a surrounding flange, certain of said edges having extended portions bent to form sockets, side clamping members formed with the said section, a receptacle held therebetween and having a removable closure, a wick tube extending into the receptacle, a wick therein and depending into the pan for supplying poison to the latter by capillary attraction, a protective cover having side frame members engaged with the sockets and a bail connecting the clamping members to extend through the cover.

In testimony whereof, I affix my signature, in presence of two witnesses.

DANIEL WILLIAM JOHN.

Witnesses:
T. M. EDWARDS,
C. A. LEWIS.

Copies of this patent may be obtained for five cents each, by addressing the "Commissioner of Patents, Washington, D. C."